United States Patent

Dunn, Jr. et al.

[11] Patent Number: 5,423,272
[45] Date of Patent: Jun. 13, 1995

[54] METHOD FOR OPTIMIZING THE OPERATING EFFICIENCY OF A FOSSIL FUEL-FIRED POWER GENERATION SYSTEM

[75] Inventors: Thomas J. Dunn, Jr., Newington; Peter Kawa; Edward S. Sadlon, both of Simsbury, all of Conn.

[73] Assignee: Combustion Engineering, Inc., Del.

[21] Appl. No.: 225,879

[22] Filed: Apr. 11, 1994

[51] Int. Cl.⁶ .................................................. F23D 1/00
[52] U.S. Cl. ...................................... 110/347; 110/264
[58] Field of Search ................ 122/4 D; 110/261–265, 110/347

[56] References Cited

U.S. PATENT DOCUMENTS

| | | | |
|---|---|---|---|
| 4,160,009 | 7/1979 | Hamabe | 122/4 D |
| 4,220,633 | 9/1980 | Pirsh | 423/239 |
| 4,602,573 | 7/1986 | Tanca | 110/347 |
| 5,020,454 | 6/1991 | Hellewell et al. | 110/264 |
| 5,054,436 | 10/1991 | Dietz | 110/347 |
| 5,189,964 | 3/1993 | Rich, Jr. | 110/347 |

Primary Examiner—Henry C. Yuen
Assistant Examiner—Weilun Lo
Attorney, Agent, or Firm—Arthur E. Fournier, Jr.

[57] ABSTRACT

A method of operating a fossil fuel-fired power generation system (10, 10', 10", 10''') in order to thereby optimize the operating efficiency thereof. The fossil fuel-fired power generation system (10, 10', 10", 10'''), which may or may not include an SCR (56), includes at least a fossil fuel-fired steam generator (12) having a burner region (16) wherein there is effected the combustion of fossil fuel and air such that gases of combustion are produced therefrom, a first heat transfer surface (32) located downstream of the burner region (16) of the fossil fuel-fired steam generator (12), a bypass (44,58,64) around the first heat transfer surface (32,32a), an air preheater (14) located downstream of the first heat transfer surface (32,32a), first and second flow paths from the burner region (16) of the fossil fuel-fired steam generator (12) to the air preheater (14) for the gases of combustion, a sensor (54) for sensing the temperature of the gases of combustion exiting from the air preheater (14), and when an SCR (56) is included a sensor (55) for sensing the temperature of the gases entering the SCR (56).

16 Claims, 5 Drawing Sheets

METHOD FOR OPTIMIZING THE OPERATING EFFICIENCY OF A FOSSIL FUEL-FIRED POWER GENERATION SYSTEM

BACKGROUND OF THE INVENTION

This invention relates to fossil-fuel fired power generation systems of the type that include at least a fossil fuel-fired steam generator and an air preheater, and more specifically, to a method of operating such fossil fuel-fired power generation systems in order to thereby optimize the operating efficiency, and particularly the low load efficiency, thereof.

In the most simplest of terms, one may define the operating efficiency of a fossil fuel-fired power generation system to be the ratio of the heat output that is derived from the fossil fuel-fired power generation system divided by the heat input of the fuel that is consumed in generating such a heat output from the fossil fuel-fired power generation system. As such, the more heat transfer which takes place within the fossil fuel-fired power generation system the lower will be the gas temperature exiting from the air preheater of the fossil fuel-fired power generation system. Moreover, the lower the gas temperature exiting from the air preheater, the higher will be the operating efficiency of the fossil fuel-fired power generation system.

Yet, it would be undesirable to lower the gas temperature exiting from the air preheater below a certain level. The temperature level to which reference is had here is the acid dewpoint temperature. To this end, if the temperature of the gas exiting from the air preheater were to be lower than the acid dewpoint temperature, a condition would thereby be created wherein the water vapor in the gas could condense out of the gas on to surfaces of the air preheater. This in turn could result in corrosion occurring particularly at the cold end, i.e., gas exit end, of the air preheater. Thus, it is desirable from the standpoint of optimizing the operating efficiency of the fossil fuel-fired power generation system that the temperature of the gas exiting from the air preheater be as low as possible, yet on the other hand from the standpoint of minimizing the possibility that the air preheater, and in particular the gas exit end thereof, not be subjected to corrosion, it is desirable that the temperature of the gas exiting from the air preheater remain above the acid dewpoint temperature.

When a fossil fuel-fired power generation system includes other components in addition to a fossil fuel-fired steam generator and an air preheater the ability to attain an optimization of the operating efficiency of the fossil fuel-fired power generation system is rendered even more difficult. An example of such another component which one finds more and more frequently being incorporated into a fossil fuel-fired power generation system is a $NO_x$ emission-reduction component. In this regard, the reduction of nitrogen oxides ($NO_x$) emissions from stationary combustion sources, such as fossil fuel-fired power generation systems, has become a critical issue in most industrialized nations of the World. As a result, the technology associated with the control of $NO_x$ emissions from fossil fuel-fired power generation systems has matured and expanded significantly.

The $NO_x$ emissions reduction processes available for use with fossil fuel-fired power generation systems through $NO_x$ control within the fossil fuel-fired steam generator, such as by means of, for example, overfire air, gas recirculation, reduced-excess-air firing, gas mixing, low-$NO_x$ concentric tangential firing, staged combustion, fluidized-bed firing, etc.; and through post combustion $NO_x$ control effected downstream of the fossil fuel-fired steam generator primarily through the use of selective catalytic reduction (SCR) equipment, provide several alternatives for meeting strict nitrogen-oxide emission levels. Depending on the $NO_x$ emission level required, an optimum $NO_x$ reduction system may result in the integration of several of the above techniques in the overall fossil fuel-fired power generation system.

After $NO_x$ control has been implemented within the fossil fuel-fired steam generator through the use of any one or more of the methods enumerated hereinabove, post combustion controls can result in further $NO_x$ emission reduction. With dry selective catalytic reduction equipment $NO_x$ reductions of eighty to ninety percent are claimed to be achievable.

The selective catalytic reduction process was originally developed for those applications where strict $NO_x$ emission requirements dictate the use of post-combustion $NO_x$ reduction techniques. The selective catalytic reduction process was initially applied to natural gas-fired power generation systems, then to low and high sulfur oil-fired power generation systems, and finally to coal-fired power generation systems.

The selective catalytic reduction system uses a catalyst and a reductant, e.g., ammonia gas, i.e., $NH_3$, to dissociate $NO_x$ to nitrogen gas and water vapor. The catalytic-reactor chamber is typically located between the economizer outlet of the fossil fuel-fired steam generator and the flue-gas inlet of the air preheater of the fossil fuel-fired power generation system. This location is typical for fossil fuel-fired power generation systems with selective catalytic reduction system operating temperatures of 575° F. to 750° F., i.e., 300° C. to 400° C.

Upstream of the selective catalytic reduction chamber are the ammonia injection pipes, nozzles, and mixing grid. Through orifice openings in the ammonia injection nozzles, a diluted mixture of ammonia gas in air is dispersed into the flue-gas stream. After the mixture diffuses, it is further distributed in the gas stream by a grid of carbon steel piping in the flue-gas duct. The ammonia/flue-gas mixture then enters the reactor where the catalytic reaction is completed.

Insofar as the optimization of the operating efficiency of a fossil fuel-fired power generation system that incorporates selective catalytic reduction, i.e., an SCR, is concerned, such optimization of the operating efficiency thereof must be attained while yet ensuring that the operating temperature requirements of the SCR are satisfied. In this regard, as has been noted herein previously, in order to realize the performance desired therefrom the SCR must be located within the fossil fuel-fired power generation system such that the operating temperature to which the SCR is subjected is between 575° F. and 750° F. Not only must this temperature range be maintained for the SCR when the fossil fuel-fired power generation is being operated at full load, but also must be maintained when the fossil fuel-fired power generation system is being operated other than at full load. Moreover, when possible it is desirable to design for higher inlet temperatures to the SCR in order to thereby render it possible to employ lower required volumes of catalyst and concomitantly achieve potentially higher efficiency of the catalyst over its life. In addition, it is desirable to be able to operate the catalyst at higher temperatures for specific periods of time to "recover" catalyst performance efficiency which may have been lost by virtue of the fact that the catalyst, although undesirable, has nevertheless been subjected to temperatures lower than the gas temperature recommended for catalyst, i.e., SCR, operation. To thus summarize, in the case of fossil fuel-fired power generation systems that incorporate an SCR therewithin, there is a need insofar as the optimization of the operating efficiency of such a fossil fuel-fired power generation system is concerned to ensure that in addition to the considerations previously discussed herein that impact upon the ability to attain such optimization there must also be taken into consideration the temperature requirements associated with the operation of the SCR.

With further regard to optimizing the operating efficiency of a fossil fuel-fired power generation system, it is desirable that such optimization prevail over the entire load range that it is contemplated that the fossil fuel-fired power generation system will be employed. In order to maximize the flexibility of controlling the gas temperature leaving the fossil fuel-fired power generation system, a flue gas bypass around a portion of the heat transfer surface thereof can be utilized. Such a bypass will have the effect of varying the gas temperature leaving the air preheater of the fossil fuel-fired power generation system and, therefore, will also have the effect of varying the overall thermal efficiency of the fossil fuel-fired power generation system.

In addition, with regard to acid dewpoint considerations, there are many outside factors that contribute to the determination of the acid dewpoint temperature (e.g., % sulphur in the coal, % oxygen in the flue gas, and ambient air temperature). Thus, it is desirable to have the capability to be able to maintain the flexibility of varying the gas temperature to react to these changing factors.

While bypassing gas around a portion of the heat transfer surface, i.e., the economizer of the fossil fuel-fired power generation system, to maintain a minimum gas inlet temperature to the SCR while reducing load, it has been common heretofore for one to find that the temperature of the gas exiting from the air preheater rises as the load output of the fossil fuel-fired power generation system decreases. This is attributable in large part to the fact that as the load output of the fossil fuel-fired power generation system decreases, while maintaining a constant gas temperature entering the air preheater (and SCR), normally less air is made to flow through the air preheater. Accordingly, since thus there is less air to be heated within the air preheater, less heat will be transferred for this purpose from the gas flowing through the air preheater to the air flowing through the air preheater. As such, the gas is, therefore, cooled to a lesser degree as the gas flows through the air preheater thereby resulting in less of a decrease in the temperature of the gas as the gas flows through the air preheater, i.e., an increase in the temperature of the gas exiting from the air preheater as contrasted to the temperature of the gas exiting from the air preheater when the fossil fuel-fired power generation system is being operated at full load. To thus summarize, just because the optimization of the operating efficiency of the fossil fuel-fired power generation system is attained when the fossil fuel-fired power generation system is being operated at full load does not ensure that such optimization of the operating efficiency of the fossil fuel-fired power-generation system will likewise be attained when the fossil fuel-fired power generation system is being operated other than at full load.

As noted herein previously it has been known heretofore to provide fossil fuel-fired power generation systems having $NO_x$ reduction equipment incorporated therewithin. In this regard, by way of exemplification and not limitation, one such fossil fuel-fired power generation system is that which forms the subject matter of U.S. Pat. No. 4,160,009, which issued on Jul. 3, 1979 and which is entitled "Boiler Apparatus Containing Denitrator." In accordance with the teachings of U.S. Pat. No. 4,160,009 there is provided in a boiler apparatus having a furnace and a plurality of heat exchangers disposed in a combustion gas channel between the furnace and boiler apparatus exits, the improvement comprising a denitrator having a catalyst disposed in the combustion gas channel downstream of at least one of the heat exchangers, a bypass duct for the combustion gas channel connecting a first region thereof in which the denitrator is disposed with a second region upstream of the first region, control valve means disposed in the duct, and a temperature detector disposed in the first region and connected to the control valve means so as to control the opening and the closing of the valve means in response to the temperature detected in the first region by the detector.

By way of exemplification and not limitation, a second such fossil fuel-fired power generation system is that which forms the subject matter of U.S. Pat. No. 4,220,633, which issued on Sep. 2, 1980 and which is entitled "Filter House and Method for Simultaneously Removing $NO_x$ and Particulate Matter from a Gas Stream." In accordance with the teachings of U.S. Pat. No. 4,220,633, there is provided a vapor generator and a filter house, the latter being disposed between the vapor generator and an air preheater. An ammonia storage tank is positioned to introduce ammonia via an ammonia distribution grid into the flue gas inlet conduit through which flue gas is transported from the vapor generator to the filter house. The filter house is designed to be operative for removing or cleansing $NO_x$ emissions from the flue gas stream transported thereto during the passage thereof through the filter house while simultaneously filtering out entrained particulate matter from the same flue gas stream.

By way of exemplification and not limitation, a third such fossil fuel-fired power generation system is that which forms the subject matter of U.S. Pat. No. 5,047,220, which issued on Sep. 10, 1991 and which is entitled "Catalytic Denitrification Control Process and System for Combustion Flue Gases." In accordance with the teachings of U.S. Pat. No. 5,047,220, there is provided a control process and system for ammonia addition to combustion flue gas streams containing excessive nitrogen oxides ($NO_x$) upstream of a catalytic denitrification unit. The control system includes a source of hot combustion gases such as that produced from a boiler or a gas turbine power plant, nozzle means for injecting ammonia into the flue gas stream, a catalytic denitrification unit provided in the flue gas stream downstream of the ammonia injection nozzle means, and an exhaust conduit or stack leading to the atmosphere and including a gas sampling and $NO_x$ analyzer device.

By way of exemplification and not limitation, a fourth such fossil fuel-fired power generation system is that which forms the subject matter of U.S. Pat. No. 5,151,256, which issued on Sep. 29, 1992 and which is entitled "Coal Combustion Apparatus Provided with a Denitration." In accordance with the teachings of U.S. Pat. No. 5,151,256 there is provided a coal combustion apparatus comprising a combustion furnace, a denitration means for removing nitrogen oxides contained in an exhaust gas from the combustion furnace by reducing the oxides with ammonia as a reducing agent, a means for collecting ashes contained in the exhaust gas having left the denitration means and a means for recycling the collected ashes into the combustion furnace, which apparatus is provided with an oxygen concentration meter in the flow path of the exhaust gas between the combustion furnace and the denitration means and also provided with an oxygen concentration-controlling means relative to air fed inside the flow path of the exhaust gas from the combustion furnace to the denitration means so as to control the oxygen concentration detected by the oxygen concentration meter to a definite value or higher.

Although fossil fuel-fired power generation systems constructed in accordance with the teachings of the four issued U.S. patents to which reference has been made hereinbefore have been demonstrated to be operative for the purpose for which they have been designed, there has nevertheless been evidenced in the prior art a need for the operation of such a fossil fuel-fired power generation system to be improved. More specifically, a need has been evidenced in the prior art for a new and improved method of operating such a fossil fuel-fired power generation system in order to thereby optimize the operating thermal efficiency thereof. To this end, there has been evidenced in the prior art a need for such a new and improved method of operating such a fossil fuel-fired power generation system in order to thereby optimize the operating thermal efficiency thereof, which would be advantageously characterized in a number of respects.

By way of exemplification and not limitation in this regard, one such advantageous characteristic that such a new and improved method of operating a fossil fuel-fired power generation system in order to optimize the operating efficiency thereof would desirably embody is that it would be employable with fossil fuel-fired power generation systems that incorporate an SCR as well as with fossil fuel-fired power generation systems that do not incorporate an SCR. A, second such advantageous characteristic that such a new and improved method of operating a fossil fuel-fired power generation system in order to thereby optimize the operating efficiency thereof would desirably embody is the capability to attain such optimization of the operating efficiency thereof both when the fossil fuel-fired power generation system is being operated at full load and when the fossil fuel-fired power generation system is being operated at other than full load. A third such advantageous characteristic that such a new and improved method of operating a fossil fuel-fired power generation system in order to thereby optimize the operating efficiency thereof would desirably embody is the capability to attain such optimization of the operating efficiency thereof while at the same time ensuring that the temperature of the gas exiting from the air preheater remains as desired relative to the dewpoint temperature. A fourth such advantageous characteristic that such a new and improved method of operating a fossil fuel-fired power generation system in order to thereby optimize the operating efficiency thereof would desirably embody is the capability to attain such optimization of the operating efficiency thereof while at the same time ensuring that when the fossil fuel-fired power generation system incorporates an SCR that the range of operating temperatures required for the operation of the SCR is maintained.

To thus summarize, a need has been evidenced in the prior art for such a new and improved method of operating a fossil fuel-fired power generation system in order to thereby optimize the operating thermal efficiency thereof which enables optimum control of the air preheater exit gas temperature to be had such that 1) it is thereby possible to alter the air preheater exit gas temperature profile over load in order to thus provide optimum combinations of fossil fuel-fired steam generator efficiency, 2) it is thereby possible to provide protection against corrosion at the air inlet end, i.e., the cold end, of the air preheater due to too low air preheater exit gas temperature, and 3) it is thereby possible to control gas temperature into and around the SCR, when the fossil fuel-fired power generation system is equipped therewith, in order to thus provide for the optimization of the life of the $NO_x$ catalyst as well as to provide for the optimization of the injection of the ammonia associated with the use of the SCR.

It is, therefore, an object of the present invention to provide a new and improved method of operating a fossil fuel-fired power generation system in order to thereby be able to attain optimization of the operating efficiency of such a fossil fuel-fired power generation system.

It is a further object of the present invention to provide such a method of operating a fossil fuel-fired power generation system in order to thereby be able to attain optimization of the operating efficiency of such a fossil fuel-fired power generation system when such a fossil fuel-fired power generation system does not incorporate selective catalytic reduction equipment, i.e., an SCR.

It is another object of the present invention to provide such a method of operating a fossil fuel-fired power generation system in order to thereby be able to attain optimization of the operating efficiency of such a fossil fuel-fired power generation system when such a fossil fuel-fired power generation system incorporates selective catalytic reduction equipment, i.e., an SCR.

Another object of the present invention is to provide such a method of operating a fossil fuel-fired power generation system in order to thereby be able to attain optimization of the operating efficiency of such a fossil fuel-fired power generation system while yet at the same time ensuring that the air preheater, and particularly the gas exit end thereof, of such a fossil fuel-fired power generation system is protected against corrosion caused by the gas exit temperature falling below the acid dewpoint temperature.

A still another object of the present invention is to provide such a method of operating a fossil fuel-fired power generation system in order to thereby be able to attain optimization of the operating efficiency of such a fossil fuel-fired power generation system when such a fossil fuel-fired power generation system is being operated at full load.

A further object of the present invention is to provide such a method of operating a fossil fuel-fired power generation system in order to thereby be able to attain optimization of the operating efficiency of such a fossil fuel-fired power generation system when such a fossil fuel-fired power generation system is bring operated at other than full load.

A still further object of the present invention is to provide such a method of operating a fossil fuel-fired power generation system in order to thereby be able to attain optimization of the operating efficiency of such a fossil fuel-fired power generation system while yet at the same time ensuring that the range of temperatures required for the selective catalytic reduction equipment, i.e., the SCR, is still satisfied.

Yet an object of the present invention is to provide such a method of operating a fossil fuel-fired power generation system in order to thereby be able to attain optimization of the operating efficiency of such a fossil fuel-fired power generation system when such a fossil fuel-fired power generation system is being employed in a new application.

Yet a further object of the present invention is to provide such a method of operating a fossil fuel-fired power generation system in order to thereby be able to attain optimization of the operating efficiency of such a fossil fuel-fired power generation system when such a fossil fuel-fired power generation system is employed in a retrofit application.

Yet another object of the present invention is to provide such a method of operating a fossil fuel-fired power generation system in order to thereby be able to attain optimization of the operating efficiency of such a fossil fuel-fired power generation system, which is relatively easy to install and operate, while yet being relatively inexpensive to provide.

SUMMARY OF THE INVENTION

In accordance with the present invention there is provided a method of optimizing the operating thermal efficiency and operation relative to acid dewpoint for corrosion considerations of a fossil fuel-fired power generation system wherein such fossil fuel-fired power generation system is of the type that includes at least a fossil fuel-fired steam generator and an air preheater, and which may or may not include selective catalytic reduction equipment, i.e., an SCR. The subject method of optimizing the operating efficiency of a fossil fuel-fired power generation system includes the steps of providing a fossil fuel-fired steam generator operative to produce gases from the combustion of fossil fuel therewithin, providing heat transfer surface downstream of the fossil fuel-fired steam generator, providing an air preheater downstream of the heat transfer surface, providing a first flow path from the fossil fuel-fired steam generator through the heat transfer surface to the air preheater for the gases produced within the fossil fuel-fired steam generator, providing a second flow path from the fossil fuel-fired steam generator directly to the air preheater for the gases produced within the fossil fuel-fired steam generator, and controlling the temperature of the gases exiting from the air preheater by controlling both the extent to which the gases produced within the fossil fuel-fired steam generator flow through the first flow path from the fossil fuel-fired steam generator to the air preheater and the extent to which the gases produced within the fossil fuel-fired steam generator flow through the second flow path from the fossil fuel-fired steam generator to the air preheater.

DESCRIPTION OF THE PREFERRED EMBODIMENT

Figure 1:
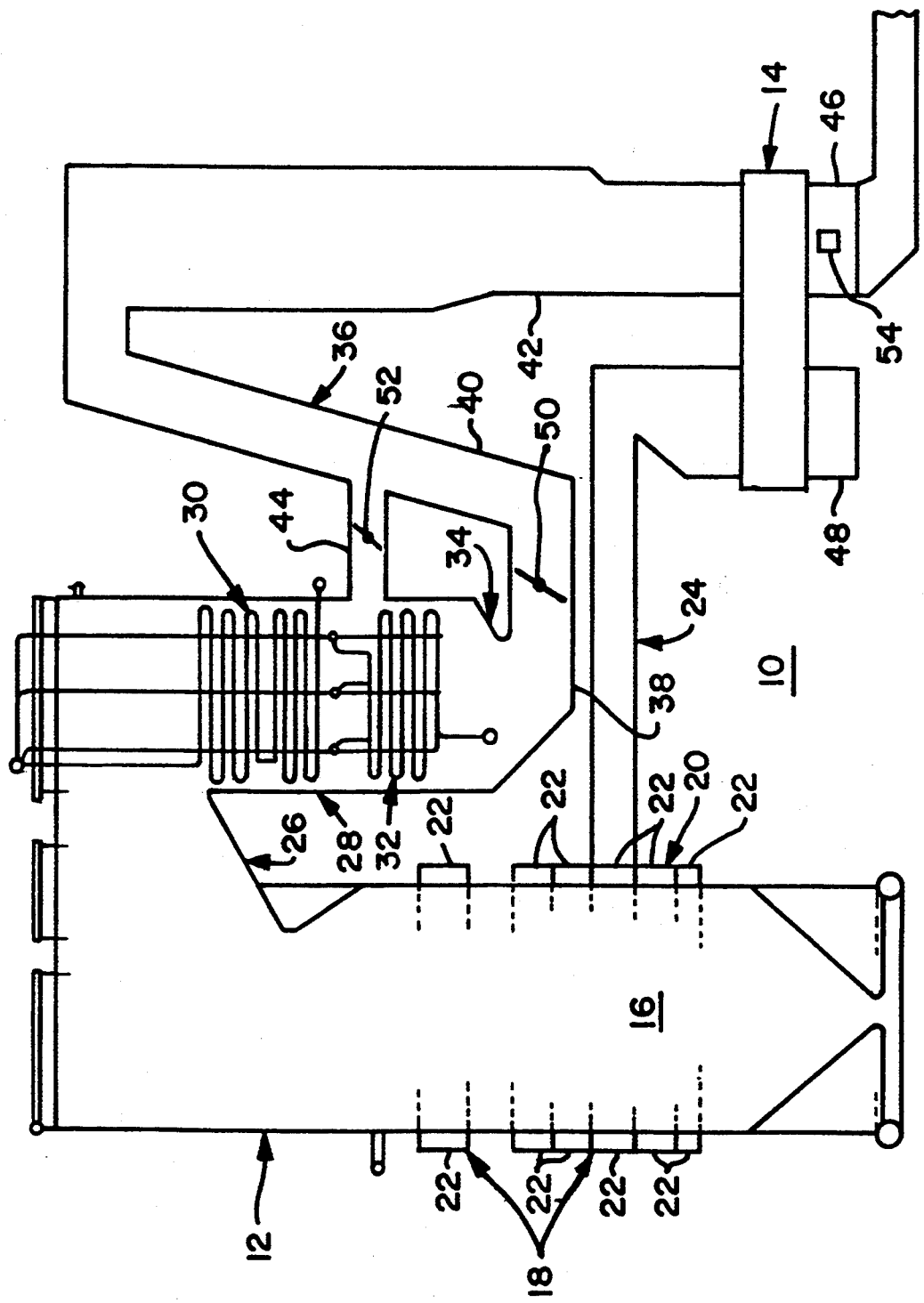
FIG. 1 is a diagrammatic representation in the nature of a vertical sectional view of one embodiment of a fossil fuel-fired power generation system with which the method of operation of the present invention is capable of being employed.

Referring now to the drawing, and more particularly to FIG. 1 thereof, there is depicted therein one embodiment of a fossil fuel-fired power generation system, generally designated by the reference numeral 10, with which the method of operation of the present invention is capable of being employed. In accordance with the illustration thereof in FIG. 1, the fossil fuel-fired power generation system 10 includes a fossil fuel-fired steam generator, generally designated by the reference numeral 12, and an air preheater, generally designated therein by the reference numeral 14.

Attention will first be focused on the fossil fuel-fired steam generator 12. In accordance with the illustration thereof in FIG. 1 of the drawing the fossil fuel-fired steam generator 12 includes a burner region, generally designated in FIG. 1 by the reference numeral 16. It is within the burner region 16 of the fossil fuel-fired steam generator 12 that the combustion of fossil fuel and air, in a manner well-known to those skilled in this art, is initiated. To this end, the fossil fuel-fired steam generator 12 is provided with a firing system, generally designated by the reference numeral 18. By way of exemplification and not limitation, the nature of the construction of the firing system 18 may take the form of that which comprises the subject matter of U.S. Pat. No. 5,020,454, which issued on Jun. 9, 1991 and which is assigned to the same assignee as the present application, or that which comprises the subject matter of U.S. patent application Ser. No. 08/062,634, which was filed on May 13, 1993 and which is assigned to the same assignee as the present patent application.

It is deemed to be adequate for purposes of acquiring an understanding of the subject matter of the present invention that there be presented herein merely a description of the nature of only some of the components of which the firing system 18 is comprised. Reference is thus had in this regard to the fact that as best understood with reference to FIG. 1 of the drawing the firing system 18 includes a housing preferably in the form of a windbox denoted generally in FIG. 1 by the reference numeral 20. The windbox 20 in a manner well-known to those skilled in this art is supported by conventional support means (not shown) in the burner region 16 of the fossil fuel-fired steam generator 12 such that the longitudinal axis of the windbox 20 extends substantially in parallel relation to the longitudinal axis of the fossil fuel-fired steam generator 12. Further, as denoted schematically at 22 in FIG. 1 the windbox 20 embodies in known fashion a plurality of compartments. In conventional fashion some of the compartments 22 are designed to function as fuel compartments from which fossil fuel is injected into the burner region 16 of the fossil fuel-fired steam generator 12, while others of the compartments 22 are designed to function as air compartments from which air is injected into the burner region 16 of the fossil fuel-fired steam generator 12. The fossil fuel, which is injected into the burner region 16 of the fossil fuel-fired steam generator 12 from the fuel compartments 22, is supplied to the windbox 20 by a fuel supply means not shown in the interest of maintaining clarity o,f illustration in the drawing. Similarly, at least some of the air, which is injected into the burner region 16 of the fossil fuel-fired steam generator 12 for purposes of effecting the combustion therewithin of the fuel that is injected thereinto, is supplied to the windbox 20 from the air preheater 14 through the duct, which is schematically depicted in FIG. 1 of the drawing wherein the duct is denoted generally by the reference numeral 24. For a more detailed description of the nature of the construction and the mode of operation of the firing system 18, one may have reference to the aforementioned U.S. Pat. No. 5,020,454 and/or to the aforementioned U.S. patent application Ser. No. 08/062,6342, U.S. Pat. No. 5,315,939.

Continuing with the description of the fossil fuel-fired steam generator 12, which is illustrated in FIG. 1 of the drawing, it is within the burner region 16 of the fossil fuel-fired steam generator 12, as has been mentioned previously herein, that the combustion of the fossil fuel and air, which is injected thereinto, is initiated. The hot gases that are produced from this combustion of the fossil fuel and air rise upwardly in the fossil fuel-fired steam generator 12. During the upwardly movement thereof in the fossil fuel-fired steam generator 12, the hot gases in a manner well-known to those skilled in this art give up heat to the fluid flowing through the tubes (not shown in the interest of maintaining clarity of illustration in the drawing) that in conventional fashion line all four of the walls of the fossil fuel-fired steam generator 12. Then, the hot gases flow through the horizontal pass, generally designated by the reference numeral 26, of the fossil fuel-fired steam generator 12, which in turn leads to the rear gas pass, generally designated by the reference numeral 28, of the fossil fuel-fired steam generator 12. Although not shown in FIG. 1 of the drawing in the interest of maintaining clarity of illustration in the drawing, it is to be understood that the horizontal pass 26 would commonly have suitably provided therewithin some form of heat transfer surface. Similarly, heat transfer surface, as illustrated at 30 and 32 in FIG. 1 of the drawing, is suitably provided within the gas pass 28. In this regard, the heat transfer surfaces 30 and 32 preferably are in the form of superheater surface and economizer surface, respectively. During the passage thereof through the rear gas pass 28 of the fossil fuel-fired steam generator 12, the hot gases give up heat to the fluid flowing through the tubes depicted in FIG. 1 of which the superheater 30 is comprised as well as to the fluid flowing through the tubes also depicted in FIG. 1 of which the economizer 32 is comprised.

Upon exiting from the rear gas pass 28 of the fossil fuel-fired steam generator 12 the hot gases are conveyed to the air preheater 14. To this end, the fossil fuel-fired steam generator 12 is connected from the exit end thereof, which is denoted generally in FIG. 1 by the reference numeral 34, to the air preheater 14 by means of duct work, which is denoted generally in FIG. 1 by the reference numeral 36. The duct work 36, in accord with the embodiment thereof illustrated in FIG. 1 of the drawing, consists of a first section designated by the reference numeral 38, a second section designated by the reference numeral 40 and a third section designated by the reference numeral 42. All three sections 38, 40 and 42 of the duct work 36 are interconnected one to another such as to define a first flow path from the exit end 34 of the fossil fuel-fired steam generator 12 to the air preheater 14 for the hot gases, which exit from the fossil fuel-fired steam generator 12. In addition to the aforedescribed first flow path, the fossil fuel-fired power generation system 10, in accord with the embodiment thereof illustrated in FIG. 1 of the drawing, also embodies a second flow path, which the hot gases produced from the combustion of fossil fuel and air within the fossil fuel-fired steam generator 12 may follow in being conveyed from the fossil fuel-fired steam generator 12 to the air preheater 14. This second flow path, as best understood with reference to FIG. 1 of the drawing, extends from a position within the fossil fuel-fired steam generator 12 located intermediate the superheater 30 and the! economizer 32 thereof through the bypass duct, denoted in FIG. 1 by the reference numeral 44, through the portion of the section 40 of the duct work 36 located downstream of the point of interconnection of the bypass duct 44 therewith, and finally through the section 42 of the duct work 36 to the air preheater 14.

For purposes of completing the description of the nature of the construction of the fossil fuel-fired power generation system 10, reference will once again be had to FIG. 1 of the drawing. As best understood with reference to FIG. 1 of the drawing, the hot gases that are conveyed from the fossil fuel-fired steam generator 12 to the air preheater 14 flow through the air preheater 14 and exit therefrom, as shown at 46, to an exhaust stack (not shown in the interest of maintaining clarity of illustration in the drawings). In the course of flowing through the air preheater 14 the hot gases give up heat to the air, which enters the air preheater 14 at the point denoted by the reference numeral 48 in FIG. 1. After being heated within the air preheater 14, this air that entered the air preheater 14 at 48 is conveyed through the duct 24, to which reference has previously been had herein, to the windbox 20 of the firing system 18. The air, which enters the air preheater 14 at 48, is supplied thereto in known fashion from an air supply means (not shown in FIG. 1 in the interest of maintaining clarity of illustration therein).

Continuing, the fossil fuel-fired power generation system 10, in accord with the embodiment thereof illustrated in FIG. 1 of the drawing, further incorporates a first damper, denoted by the reference numeral 50 in FIG. 1 which is suitably mounted, through the use of any conventional form of mounting means suitable for use for such a purpose, within the section 38 of the duct work 36 so as to be operatively movable to any position between and including that of fully open and that of fully closed, and a second damper, denoted by the reference numeral 52 in FIG. 1, which is suitably mounted, through the use of any ,conventional form of mounting means suitable for use for such a purpose, within the bypass duct 44 so as to be operatively movable as is the first damper 50 to any position between and including that of fully open and that of fully closed. As will be described more fully hereinafter in connection with the description of the subject matter of FIG. 5 of the drawing, the movement of the first damper 50 and that of the second damper 52 is designed to be controlled by means of the sensor, which is schematically depicted at 54 in FIG. 1 of the drawing.

A description will next be had herein of the mode of operation of the fossil fuel-fired power generation system 10, which is illustrated in FIG. 1 of the drawing. In accordance with the mode of operation of the fossil fuel-fired power generation system 10 of FIG. 1, fossil fuel and air are injected through the compartments 22 of the windbox 20 into the burner region 16 of the fossil fuel-fired steam generator 12 whereat combustion of the fossil fuel and air is initiated in a manner well-known to those skilled in this art. As has been noted herein previously, the hot gases that are produced as a result of this combustion of the fossil fuel and air within the burner region 16 of the fossil fuel-fired steam generator 12 thereafter rise upwardly within the fossil fuel-fired steam generator 12 and in doing so flow to and through the horizontal pass 26 of the fossil fuel-fired steam generator 12, and then flow from the horizontal pass 26 to the rear gas pass 28 of the fossil fuel-fired steam generator 12.

In the course of traversing the rear gas pass 28 of the fossil fuel-fired steam generator 12, the hot gases give up heat to the fluid flowing through the tubes, which collectively comprise the superheater 30. After flowing past the superheater 30, the hot gases in flowing to the air preheater 14 from the fossil fuel-fired steam generator 12 may then follow either the first flow path or the second flow path, both flow paths having been described hereinbefore, or may follow a combination of both flow paths, i.e., a portion of the hot gases may flow to the air preheater 14 by way of the first flow path and the remaining portion of the hot gases may flow to the air preheater 14 by way of the second flow path. The particular flow path, which the hot gases follow in flowing to the air preheater 14 from the fossil fuel-fired steam generator 12, is determined by the position that the damper 50 occupies in the section 38 of the duct work 36 and by the position that the damper 52 occupies in the bypass duct 44. In turn, the relative position that the damper 50 occupies within the section 38 of the duct work 36 and the relative position that the damper 52 occupies within the bypass duct 44 is, in accordance with the present invention, designed to be a function of the temperature of the gas at the exit end 46 of the air preheater 14. Namely, the temperature of the gas leaving the air preheater 14, in accordance with the method of the present invention, e.g., the method of optimizing the operating thermal efficiency of the fossil fuel-fired power generation system 10 illustrated in FIG. 1 of the drawing, is designed to be maintained as low as possible at all operating loads of the fossil fuel-fired power generation system 10, while yet ensuring that the temperature of the gas leaving the air preheater 14 remains at a level desirable relative to the acid dewpoint temperature in order to thereby minimize corrosion from occurring at the gas exit end 46 of the air preheater 14. To this end, as has been described previously herein a sensor 54 is positioned at the gas exit end 46 of the air preheater 14. The sensor 54 is designed to be operative to sense the temperature of the gas at the exit end 46 of the air preheater 14, and to generate a signal in response to such sensing thereby of the gas exit temperature. The signal generated by the sensor 54 in turn is designed to be operative to effect the positioning of the damper 50 in the section 38 of the duct work 36 and the positioning of the damper 52 in the bypass duct 44. As a consequence of such positioning of the damper 50 in the section 38 of the duct work 36 and of the damper 52 in the bypass duct 44 in response to the signal received thereby from the sensor 54, which is representative of the temperature at the gas exit end 46 of the air preheater 14 that has been sensed by the sensor 54, the hot gases produced from the combustion of the fossil fuel and air within the burner region 16 of the fossil fuel-fired steam generator 12 are made to flow to the air preheater 14 along either the first flow path, which has been described herein previously, or along the second flow path, which also has been described herein previously, or along both the first flow path and the second flow path.

That is, depending upon the positioning of the damper 50 in the section 38 of the duct work 36 and the positioning of the damper 52 in the bypass duct 44, the hot gases, after entering the rear gas pass 28 and flowing past the superheater 30 in the course of which the hot gases give up heat to the fluid flowing through the tubes of the superheater 30, will continue to flow through the rear gas pass 28 past the economizer 32 during which the hot gases will give up additional heat to the fluid flowing through the tubes of the economizer 32 and then through each of the sections 38, 40 and 42 of the duct work 36, i.e., will flow along the first flow path, to the air preheater 14, or will flow through the bypass duct 44 into the section 40 of the duct work 36 located downstream of the point of interconnection of the bypass duct 44 with the section 40 and then into the section 42 of the duct work 36, i.e., will flow along the second flow path, to the air preheater 14, or a portion of the hot gases may flow past the economizer 32 during which that portion of the hot gases will give up heat to the fluid flowing through the tubes of the economizer 32 while the remainder of the hot gases flow by way of the bypass duct 44 to the air preheater 14 such that the portion of the hot gases that flow through the bypass duct 44 does not give up any heat to any heat transfer surface prior to reaching the air preheater 14. Regardless of whether the hot gases reach the air preheater 14 by way of the aforedescribed first flow path or by way of the aforedescribed second flow path or by way of a combination of both the first flow path and the second flow path, the hot gases during the passage thereof through the air preheater 14 will give up additional heat to the air which enters the air preheater 14 at 48 such as to thereby heat this air prior to the air's passage through the duct 24 to the windbox 20 whereupon the heated air is injected into the burner region 16 of the fossil fuel-fired steam generator 12 for purposes of effecting therewith the combustion of the fossil fuel within the burner region 16.

Thus, it should be readily apparent from the preceding description that the hot gases, which are produced from the combustion of fossil fuel and air within the burner region 16 of the fossil fuel-fired steam generator 12, give up heat at various locations within the fossil fuel-fired power generation system 10 from the time the hot gases are produced in the burner region 16 of the fossil fuel-fired steam generator 12 until the gases exit at 46 from the air preheater 14. Further, it should be readily apparent that the temperature at which the gases exit from the air preheater 14 is a function of how much heat the hot gases give up between their point of origin, i.e., the burner region 16 of the fossil fuel-fired steam generator 12, and the point at which they exit, i.e., at 46, from the air preheater 14.

It has been found to be possible with the method of optimizing the operating thermal efficiency and cold end corrosion potential of a fossil fuel-fired power generation system in accordance with the present invention, such as the fossil fuel-fired power generation system 10 illustrated in FIG. 1, to control the temperature at which the gas exits from the air preheater 14 at 46 by controlling the amount of heat that the hot gases give up while flowing from the point of their origin to the point of their discharge from the air preheater 14, i.e., by controlling, i.e., by regulating, by means of the positioning of the damper 50 in the section 38 of the duct work 36 and the damper 52 in the bypass duct 44 the extent to which the hot gases do or do not flow through the rear gas pass 28 past the economizer 32 and thereby are or are not further cooled by virtue of their giving up heat to the fluid flowing through the tubes of the economizer 32. In this regard, in accord with the preferred embodiment of the invention the damper 50 and the damper 52 are designed to move in unison in response to the signals received thereby from the sensor 54. Thus, by way of summary, in order to maintain the temperature of the gas exiting at 46 from the air preheater 14 at the desired temperature level, i.e., at that required to attain optimization of the operating thermal efficiency of a fossil fuel-fired power generation system in accord with the method of the present invention and yet at an acceptable level relative to the acid dewpoint temperature, the hot gases upon leaving the superheater 30 are either made to flow totally or partially or not at all past the economizer 32 depending upon the extent to which the temperature of the hot gases leaving the superheater 30 must be reduced in order to ensure that after the hot gases during the passage thereof through the air preheater 14 give up the necessary heat to the air flowing through the air preheater 14 the gas exiting at 46 from the air preheater 14 will be at the desired temperature level, i.e., at that temperature required to effect optimization of the operating thermal efficiency of the fossil fuel-fired power generation system 10.

A discussion will now be had herein of a second embodiment of a fossil fuel-fired power generation system with which the method of operation of the present invention is capable of being employed. For purposes of this discussion, reference will be had to FIG. 2 of the drawing wherein the subject second embodiment of a fossil fuel-fired power generation system has been denoted generally, for ease of reference, by reference numeral 10. Inasmuch as the fossil fuel-fired power generation system 10 is similar, both in terms of its construction and its mode of operation, to the fossil fuel-fired power generation system 10 of FIG. 1, those components of the fossil fuel-fired power generation system 10' of FIG. 2 that are the same as the components of the fossil fuel-fired power generation system 10 of FIG. 1 are denoted in both FIG. 1 and FIG. 2 of the drawing by the same reference numeral. The primary difference between the fossil fuel-fired power generation system 10 of FIG. 1 and the fossil fuel-fired power generation system 10' of FIG. 2 resides in the fact that the fossil fuel-fired power generation system 10' in addition to including a fossil fuel-fired steam generator 12 and an air preheater 14 as does the fossil fuel-fired power generation system 10 of FIG. 1 also includes selective catalytic reduction equipment, i.e., an SCR, denoted generally by the reference numeral 56 in FIG. 2, which the fossil fuel-fired power generation system 10 of FIG. 1 does not embody. In addition, whereas the fossil fuel-fired power generation system 10 of FIG. 1 includes a single section of economizer, denoted in FIG. 1 by the reference numeral 32, the fossil fuel-fired power generation System 10' of FIG. 2 includes two sections of economizer, which for ease of reference are denoted generally in FIG. 2 by the reference numerals 32a' and 32b', respectively.

Figure 2:
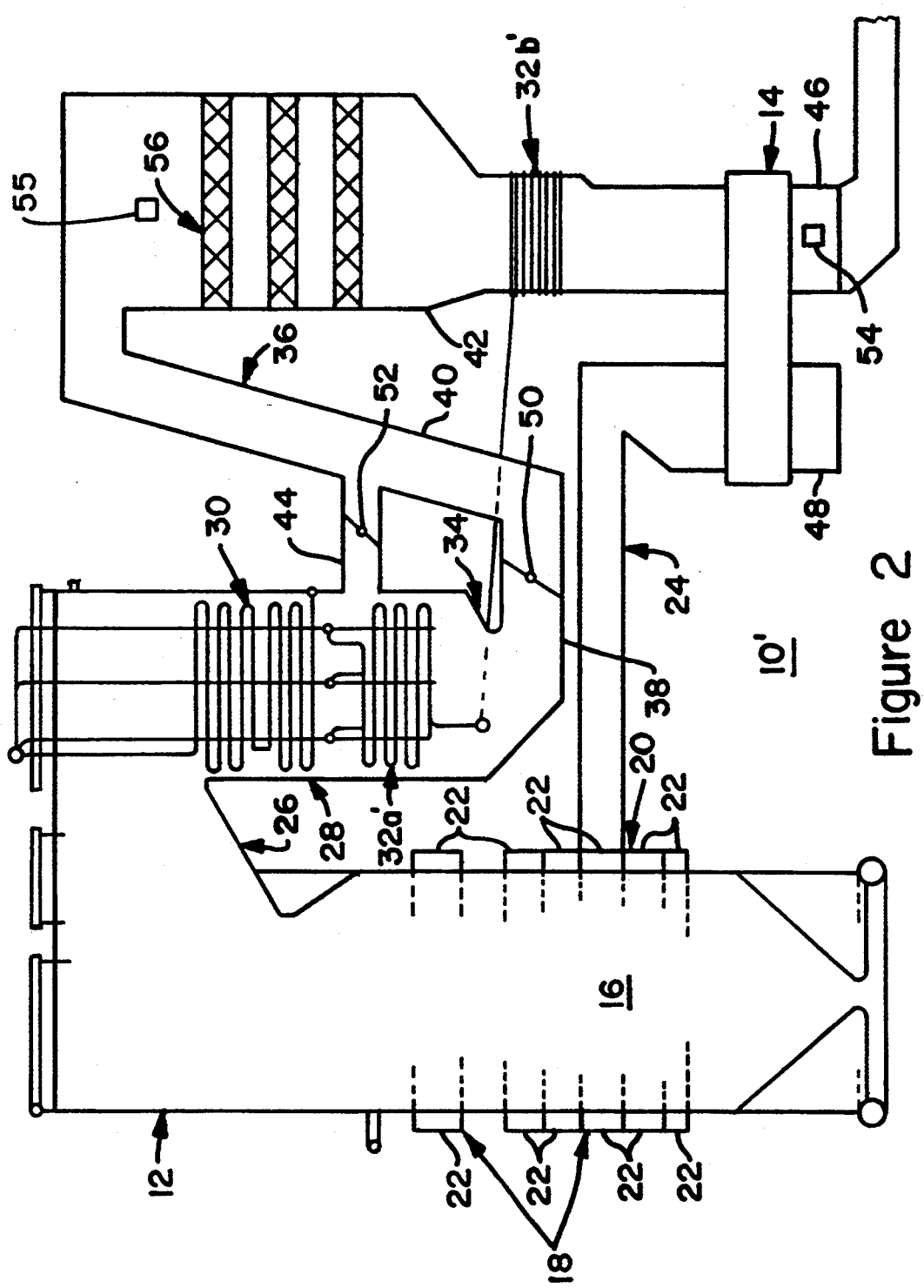
FIG. 2 is a diagrammatic representation in the nature of a vertical sectional view of a second embodiment of a fossil fuel-fired power generation system with which the method of operation of the present invention is capable of being employed.

Continuing with the description thereof, the fossil fuel-fired power generation system 10' of FIG. 2, like the fossil fuel-fired power generation system of FIG. 1, includes a fossil fuel-fired steam generator 12, an air preheater 14 and a duct work 36 that is operative to interconnect in gas flow relation the exit end 34 of the fossil fuel-fired steam generator 12 to the air preheater 14. Moreover, the fossil fuel-fired steam generator 12 of the fossil fuel-fired power generation system 10' of FIG. 2, like the fossil fuel-fired steam generator 12 of the fossil fuel-fired power generation system 10 of FIG. 1, includes a burner region 16 whereat the firing system 18 is operative to effect the combustion of the fossil fuel that is injected thereinto through compartments 22 of the windbox 20 and of the air that is injected thereinto through compartments 22 of the windbox 20 after the air has been supplied thereto from the air preheater 14 by means of the duct 24, a horizontal pass 26, and a rear gas pass 28 in which a superheater 30 and the first economizer section 32a' are each suitably positioned. As in the case of the air preheater 14 of the fossil fuel-fired power generation system 10 of FIG. 1, the gas exits at 46 and the air enters at 48 the air preheater 14 of the fossil fuel-fired power generation system 10' of FIG. 2. Further, the air preheater 14 of the fossil fuel-fired power generation system 10' of FIG. 2 like the air preheater 14 of the fossil fuel-fired power generation system 10 of FIG. 1 is provided with a sensor 54 for sensing the temperature of the gas exiting the air preheater 14 at 46. Insofar as the duct work 36 of the fossil fuel-fired power generation system 10' of FIG. 2 is concerned, like the duct work 36 of the fossil fuel-fired power generation system 10 of FIG. 1, the duct work 36 of the fossil fuel-fired power generation system 10' of FIG. 2 is comprised of three sections; namely, the sections 38, 40 and 42, which are joined in gas flow relation one to another. However, unlike the section 42 of the duct work 36 of the fossil fuel-fired power generation system 10 of FIG. 1, the section 42 of the duct work 36 of the fossil fuel-fired power generation system 10' of FIG. 2 has suitably provided therewithin the SCR 56 and the second economizer section 32b', and with the second economizer section 32b' being located downstream of the SCR 56. With further reference to the duct work 36 of the fossil fuel-fired power generation system 10' of FIG. 2, the section 40 thereof, in the same fashion as the section 40 of the fossil fuel-fired power generation system 10 of FIG. 1, is connected to the rear gas pass 28 of the fossil fuel-fired power generation system 10' of FIG. 2 by means of the bypass duct 44. Finally, the fossil fuel-fired power generation system 10' of FIG. 2, like the fossil fuel-fired power generation system 10 of FIG. 1, includes a damper 50 suitably mounted within the section 38 of the fossil fuel-fired power generation system 10' of FIG. 2 for movement therewithin in response to signals received thereby from the sensor 54 of the fossil fuel-fired power generation system 10' of FIG. 2, and a damper 52 suitably mounted within the bypass duct 44 of the fossil fuel-fired power generation system 10' of FIG. 2 for movement therewithin in response to signals received thereby from the sensor 54 of the fossil fuel-fired power generation system 10' of FIG. 2.

A description will now be had herein of the mode of operation of the fossil fuel-fired power generation system 10', which is illustrated in FIG. 2 of the drawing. To this end, the mode of operation of the fossil fuel-fired power generation system 10' of FIG. 2 is the same as that of the fossil fuel-fired power generation system 10 of FIG. 1 with two exceptions, which are occasioned by the fact that unlike the fossil fuel-fired power generation system 10 of FIG. 1, the fossil fuel-fired power generation system 10' of FIG. 2 embodies therewith in the SCR 56 and the second economizer section 32b'. As such, since the SCR 56 requires for its operation that the temperature of the gases that flow therethrough be within a prescribed temperature range, there is thus a need in the case of the fossil fuel-fired power generation system 10' of FIG. 2 to ensure, unlike in the case of the fossil fuel-fired power generation system 10 of FIG. 1, that the hot gases do not give up too much heat in flowing from the fossil fuel-fired steam generator 12 of the fossil fuel-fired power generation system 10' of FIG. 2 to the air preheater 14 thereof as to result in the temperature of the hot gases being below the aforementioned prescribed temperature range when the hot gases flow through the SCR 56, or on the other hand that the hot gases do not give up enough heat in flowing from the fossil fuel-fired steam generator 12 of the fossil fuel-fired power generation system 10' of FIG. 2 to the air preheater 14 thereof as to result in the temperature of the hot gases being above the aforementioned prescribed temperature range when the hot gases flow through the SCR 56. To this end, a sensor, denoted by the reference numeral 55 in FIG. 2, is preferably positioned at the upstream end of the SCR 56. The sensor 55 is designed to be operative to sense the temperature of the gas at the upstream end of the SCR 56, and to generate a signal in response to such sensing of the temperature of the gas entering the SCR 56 whenever the temperature of the gas entering the SCR 56 is sensed to be below, i.e., $T_{MIN}$, or above, i.e., $T_{MAX}$, the aforementioned prescribed temperature range. In addition, since the hot gases in order to reach the air preheater 14 of the fossil fuel-fired power generation system 10' of FIG. 2 from the fossil fuel-fired steam generator 12 thereof must flow past the second economizer section 32b' and in the course of which the hot gases will give up heat to the fluid flowing through the tubes of which the second economizer section 32b' is comprised, there is thus also a need to ensure that the temperature level of the hot gases exiting from the second economizer section 32b' is sufficient, when there is taken into account the fact that the hot gases in the course of flowing through the air preheater 14 of the fossil fuel-fired power generation system 10' of FIG. 2 will give up additional heat to the air entering the air preheater 14 at 48, as to result in the temperature of the gas that exits at 46 from the air preheater 14 of the fossil fuel-fired power generation system 10' of FIG. 2 being as low as possible in order to attain optimization of the operating efficiency of the fossil fuel-fired power generation system 10' of FIG. 2 while yet still being at an acceptable level relative to the acid dewpoint temperature so as to minimize corrosion of the air preheater 14. Therefore, the operating temperature requirements of the SCR 56 as well as the cooling effect on the hot gases of the second economizer section 32b' need to be taken into account insofar as concerns the flow path, which the hot gases follow in flowing from the fossil fuel-fired steam generator 12 of the fossil fuel-fired power generation system 10' of FIG. 2 to the air preheater 14 thereof. To this end, based on the signals received thereby from the sensor 54 and the sensor 55 of the fossil fuel-fired power generation system 10' of FIG. 2, the dampers 50 and 52 of the fossil fuel-fired power generation system 10' of FIG. 2 are each suitably positioned such that the hot gases are made to follow a particular flow path in flowing from the fossil fuel-fired steam generator 12 of the fossil fuel-fired power generation system 10' of FIG. 2 to the air preheater 14 thereof. That is, the hot gases are made to follow that particular flow path in flowing from the fossil fuel-fired steam generator 12 of the fossil fuel-fired power generation system 10' of FIG. 2 to the air preheater 14 thereof whereby the amount of heat given up by the hot gases in flowing along this particular flow path is suitably controlled by means of the positioning of the dampers 50 and 52 of the fossil fuel-fired power generation system 10' of FIG. 2 such that the temperature of the gas exiting at 46 from the air preheater 14 of the fossil fuel-fired power generation system 10' of FIG. 2 is made to be as low as possible in order to thus attain optimization of the operating thermal efficiency of the fossil fuel-fired power generation system 10' of FIG. 2 while yet ensuring that the gas exit temperature remains at an acceptable level relative to the acid dewpoint temperature and that the temperature level of the hot gases as the hot gases flow through the SCR 56 remains within the prescribed temperature range that the SCR 56 requires for its operation.

Figure 3:
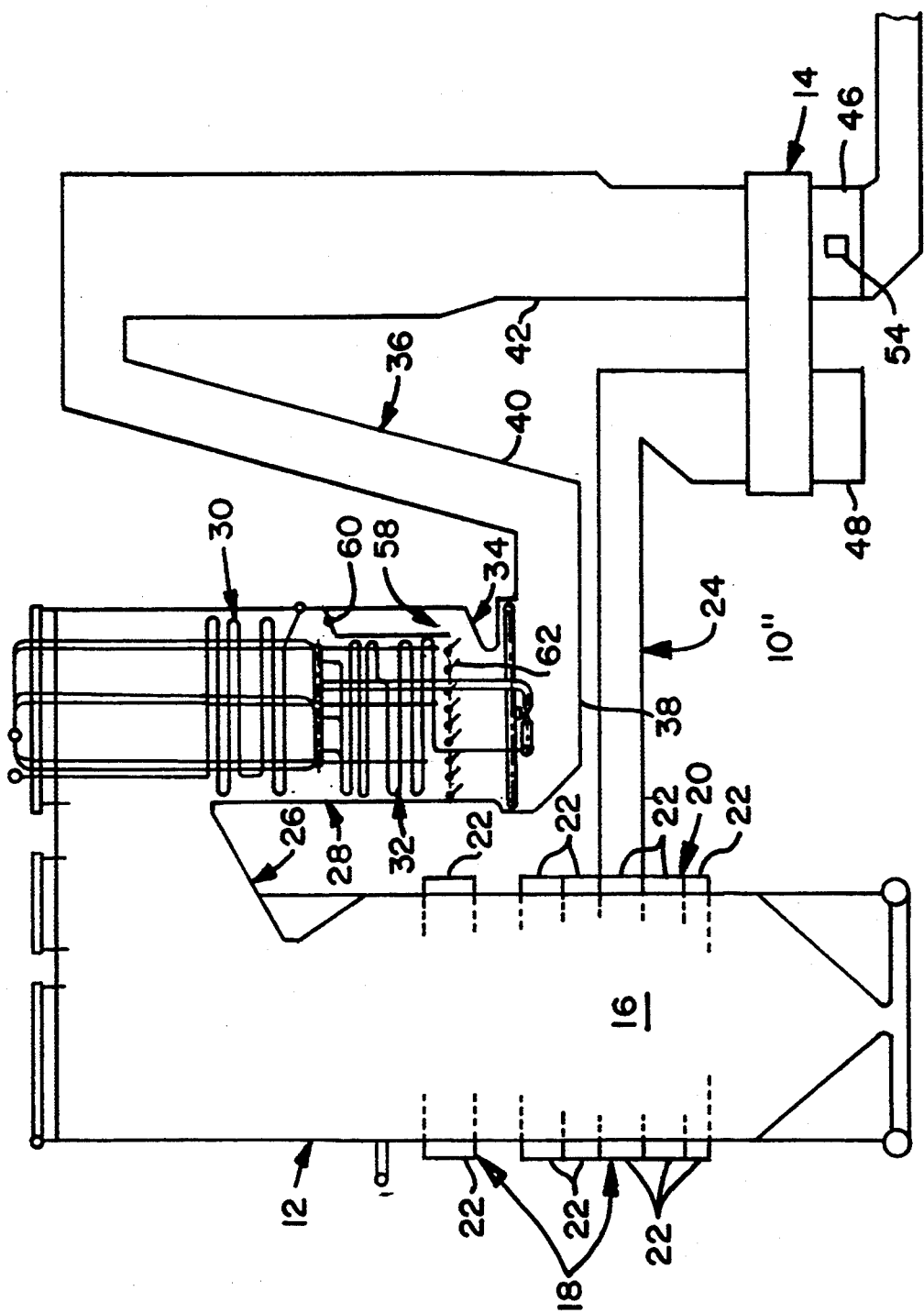
FIG. 3 is a diagrammatic representation in the nature of a vertical sectional view of a third embodiment of a fossil fuel-fired power generation system with which the method of operation of the present invention is capable of being employed.

A discussion will next be had herein of a third embodiment of a fossil fuel-fired power generation system with which the method of operation of the present invention is capable of being employed. For purposes of this discussion, reference will be had to FIG. 3 of the drawing wherein the subject third embodiment of a fossil fuel-fired power generation system has been denoted generally, for ease of reference, by reference numeral 10". Inasmuch as the fossil fuel-fired power generation system 10" is essentially the same, both in terms of its construction and its mode of operation, as the fossil fuel-fired power generation system 10 of FIG. 1, those components of the fossil fuel-fired power generation system 10" of FIG. 3 that are the same as the components of the fossil fuel-fired power generation system 10 of FIG. 1 are denoted in both FIG. 1 and FIG. 3 of the drawing by the same reference numeral. The only difference between the fossil fuel-fired power generation system 10" of FIG. 3 and the fossil fuel-fired power generation system 10 of FIG. 1 resides in the fact that whereas the fossil fuel-fired power generation system 10 of FIG. 1 incorporates an external bypass, i.e., the bypass duct 44 that has the damper 52 suitably mounted for movement therewithin, and the damper 50 suitably mounted in section 38 of the duct work 36 thereof for movement therewithin, the fossil fuel-fired power generation system 10" of FIG. 3 includes an internal bypass, denoted generally in FIG. 3 by the reference numeral 58 with which there is cooperatively associated a first damper means, in the form of a single damper denoted in FIG. 3 by the reference numeral 60, and a second damper means, in the form of a plurality of dampers denoted in FIG. 3 of the drawing by the reference numeral 62 that are suitably connected one to another in gang-like fashion through the use of any conventional form of connection means suitable for use for such a purpose so as to collectively move as one. The damper 60 and the plurality of dampers 62 function in the same manner as the dampers 50 and 52 of the fossil fuel-fired power generation system 10 of FIG. 1. Namely, based on the sensings made thereby, the sensor 54 of the fossil fuel-fired power generation system 10" of FIG. 3 transmits signals to the damper 60 and the plurality of dampers 62, which are operative to effect the positioning of the damper 60 and the plurality of dampers 62, so as to thereby control to what extent, if at all, the hot gases are made to flow by way of the internal bypass 58 to the air preheater 14 of the fossil fuel-fired power generation system 10" of FIG. 3, i.e., to what extent heat is given up by the hot gases in the course of flowing from the fossil fuel-fired steam generator 12 of the fossil fuel-fired power generation system 10" to the air preheater 14 of the fossil fuel-fired power generation system 10"and thereby the gas exit temperature at 46 of the air preheater 14 of the fossil fuel-fired power generation system 10".

Figure 4:
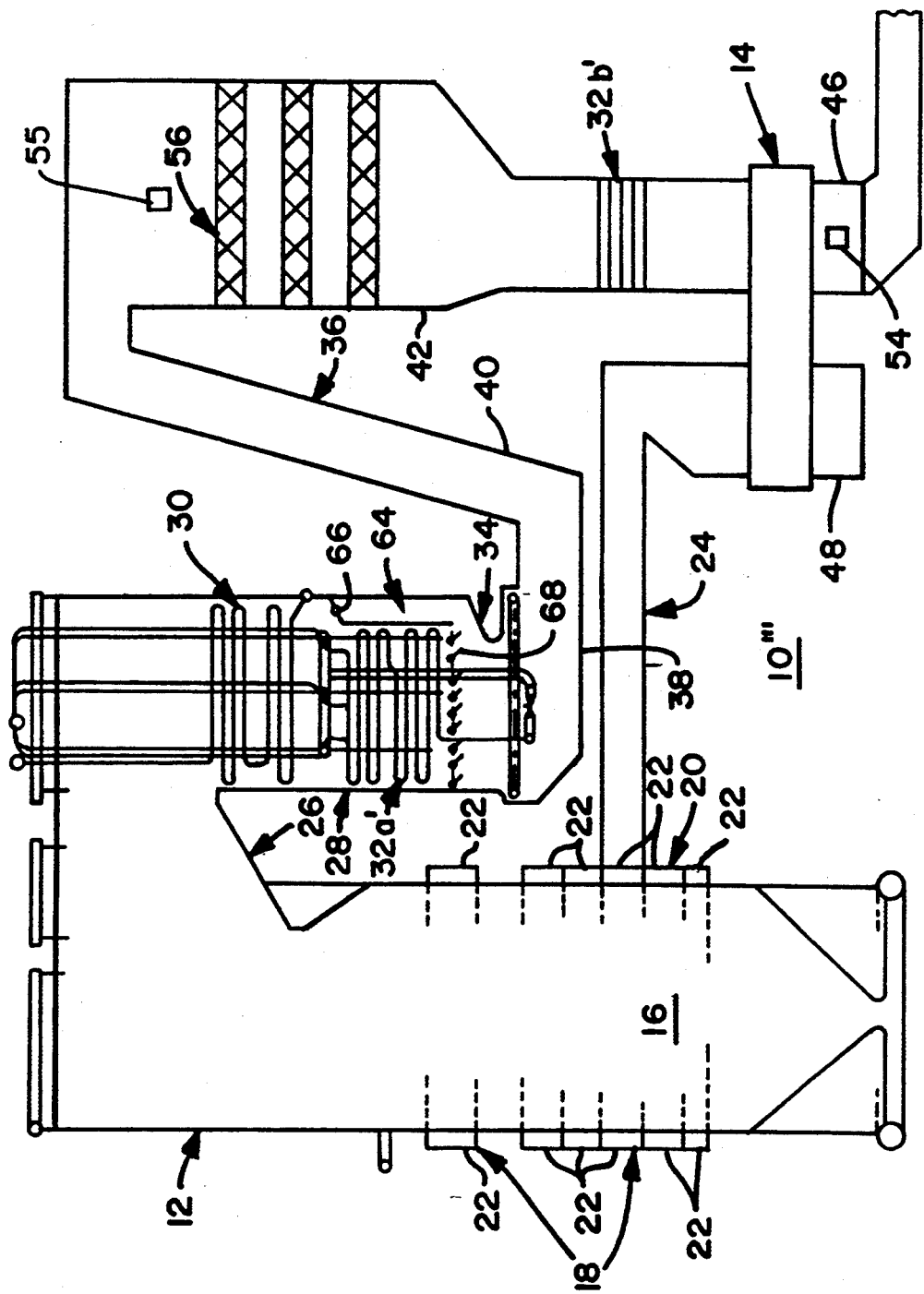
FIG. 4 is a diagrammatic representation in the nature of a vertical sectional view of a fourth embodiment of a fossil fuel-fired power generation system with which the method of operation of the present invention is capable of being employed.

Next, a discussion will be had herein of a fourth embodiment of a fossil fuel-fired power generation system with which the method of operation of the present invention, is capable of being employed. For purposes of this discussion, reference will be had to FIG. 4 of the drawing wherein the subject fourth embodiment of a fossil fuel-fired power generation system has been denoted generally, for ease of reference by reference numeral 10'''. Inasmuch as fossil fuel-fired power generation system 10''' is essentially the same, both in terms of its construction and its mode of operation, as the fossil fuel-fired power generation system 10' of FIG. 2, those components of the fossil fuel-fired power generation system 10''' of FIG. 4 that are the same as the components of the fossil fuel-fired power generation system 10' of FIG. 2 are denoted in both FIGS. 2 and 4 of the drawing by the same reference numeral. The only difference between the fossil fuel-fired power generation system 10''' of FIG. 4 and the fossil fuel-fired power generation system 10' of FIG. 2 resides in the fact that whereas the fossil fuel-fired power generation system 10' of FIG. 2 incorporates an external bypass, i.e., the bypass duct 44 that has the damper 52 suitably mounted for movement therewithin, and the damper 50 suitably mounted in section 38 of the duct work 36 thereof for movement therewithin, the fossil fuel-fired power generation system 10''' of FIG. 4 includes an internal bypass, denoted generally in FIG. 4 by the reference numeral 64 with which there is cooperatively associated a first damper means, in the form of a single damper denoted in FIG. 4 by the reference numeral 66, and a second damper means, in the form of a plurality of dampers denoted in FIG. 4 of the drawing by the reference numeral 68 that are suitably connected one to another in gang-like fashion through the use of any conventional form of connection means suitable for use for such a purpose so as to collectively move as one. The damper 66 and the plurality of dampers 68 function in the same manner as the dampers 50 and 52 of the fossil fuel-fired power generation system 10' of FIG. 2. Namely, based on the sensings made thereby the sensor 54 and the sensor 55 of the fossil fuel-fired power generation system 10''' of FIG. 4 transmit signals to the damper 66 and the plurality of dampers 68, so as to thereby control to what extent, if at all, the hot gases are made to flow by way of the internal bypass 64 to the air preheater 14 of the fossil fuel-fired power generation system 10''' of FIG. 4, i.e., to what extent heat is given up by the hot gases in the course of flowing from the fossil fuel-fired steam generator 12 of the fossil fuel-fired power generation system 10''' to the air preheater 14 of the fossil fuel-fired power generation system 10''' and thereby the gas exit temperature at 46 of the air preheater 14 of the fossil fuel-fired power generation system 10'''.

Figure 5:
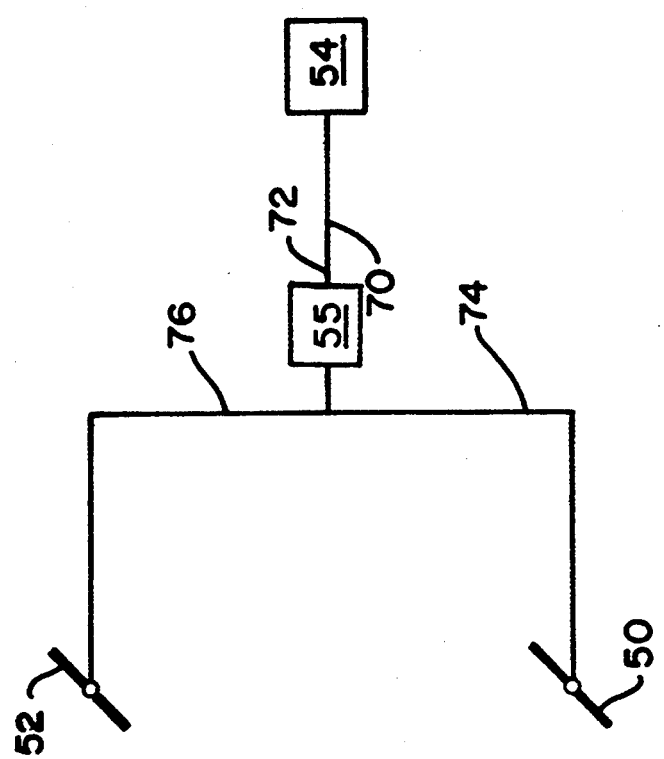
FIG. 5 is a schematic diagram of the control scheme that is employed in the method of operation of the present invention.

Lastly, reference is had here to FIG. 5 wherein there is depicted a schematic diagram of the control scheme that is employed in the method of operation of the present invention wherein the sensor 54 senses the gas exit temperature at 46 of the air preheater 14 of, by way of exemplification and not limitation, the fossil fuel-fired power generation system 10' of FIG. 2 of the drawing, and the sensor 55 senses the temperature of the gas entering the SCR 56, and wherein the sensors 54 and 55 transmit signals in response to the sensings made thereby to the dampers 50 and 52, by way of exemplification and not limitation, of the fossil fuel-fired power generation system 10' of FIG. 2 such that the signals transmitted by the aforereferenced sensor 54 and sensor 55 are operative to effect the desired positioning of the aforereferenced dampers 50 and 52. In tills regard, preferably the mode of operation of the sensor 55 is such that the signal generated by the sensor 55 is made to dominate the signal generated by the sensor 54 whereby the temperature of the gas entering the SCR 56 is made to remain within the prescribed temperature range required by the SCR 56. Continuing, as best understood with reference to FIG. 5 of the drawing, the aforereferenced sensor 54 and the aforereferenced sensor 55 are suitably connected in circuit relation, as depicted schematically in FIG. 5 of the drawing, to the aforereferenced dampers 50 and 52 by means of the circuit means, denoted generally by the reference numeral 70 in FIG. 5. More specifically, the circuit means 70 is operative to effect the interconnection of the aforereferenced sensor 54 and the aforereferenced sensor 55 to the aforereferenced damper 50 by means of the circuitry schematically depicted at 72 and 74 in FIG. 5 and the interconnection of the aforereferenced sensor 54 and the aforereferenced sensor 55 to the aforereferenced damper 52 by means of the circuitry schematically depicted at 72 and 76 in FIG. 5.

Therefore, to summarize, the method of operating a fossil fuel-fired power generation system to optimize the operating thermal efficiency thereof in accordance with the present invention allows for a wide range of optimization of gas temperature profiles a) leaving the fossil fuel-fired steam generator, b) entering the SCR when the fossil fuel-fired power generation system incorporates an SCR, c) entering the air preheater, and d) leaving the air preheater, depending on fuel and site specifics. Moreover, the method of operating a fossil fuel-fired power generation system to optimize the operating thermal efficiency thereof in accordance with the present invention allows for optimum control of the air preheater exit gas temperature utilizing a combination of economizer surface located in the rear gas pass downstream of the superheater, economizer bypass ducting, and additional economizer surface downstream of the SCR when the fossil fuel-fired power generation system incorporates an SCR. To this end, the economizer bypass ducting is used to a) alter the air preheater exit gas temperature over load to provide optimum combinations of fossil fuel-fired power generation system efficiency, b) provide protection against cold end corrosion of the air preheater due to low air preheater exit gas temperature, and c) control the temperature of the hot gases into and around the SCR, when the fossil fuel-fired power generation system incorporates an SCR, in order to thereby achieve optimization of catalyst life and ammonia injection of the SCR. Further, the method of operating a fossil fuel-fired power generation system to optimize the operating thermal efficiency thereof in accordance with the present invention allows, when the fossil fuel-fired power generation system incorporates an SCR, for design of higher inlet temperatures to the SCR, which in turn can result in lower required volumes of catalyst and potentially higher efficiency of the catalyst over its life. Also, it affords the process control, through use of the economizer bypass ducting to operate the catalyst at higher temperatures for specific periods of time to "recover" catalyst performance efficiency lost due to periods of time when the SCR may have been operated at lower than recommended gas temperatures. Additionally, the lower catalyst volume required with the higher SCR inlet temperatures will result in lower draft losses resulting in lower fan power consumptions and will also reduce the catalyst disposal cost over the life of the fossil fuel-fired power generation system.

Thus, in accordance with the present invention there has been provided a new and improved method of operating a fossil fuel-fired power generation system in order to thereby be able to attain optimization of the operating thermal efficiency of such a fossil fuel-fired power generation system. As well, there has been provided in accord with the present invention a new and improved method of operating a fossil fuel-fired power generation system in order to thereby be able to attain optimization of the operating efficiency of such a fossil fuel-fired power generation system when such a fossil fuel-fired power generation system does not incorporate selective catalytic equipment, i.e., an SCR. Moreover, in accordance with the present invention there has been provided a new and improved method of operating a fossil fuel-fired power generation system in order to thereby be able to attain optimization of the operating efficiency of such a fossil fuel-fired power generation system when such a fossil fuel-fired power generation system incorporates selective catalytic reduction equipment, i.e., an SCR. Also, there has been provided in accord with the present invention a new and improved method of operating a fossil fuel-fired power generation system in order to thereby be able to attain optimization of the operating efficiency of such a fossil fuel-fired power generation system while yet at the same time ensuring that the air preheater, and particularly the gas exit end thereof, of such a fossil fuel-fired power generation system is protected against corrosion caused by low gas exit temperatures. Further, in accordance with the present invention there has been provided a new and improved method of operating a fossil fuel-fired power generation system in order to thereby be able to attain optimization of the operating efficiency of such a fossil fuel-fired power generation system when such a fossil fuel-fired power generation system is being operated at full load. Besides, there has been provided in accord with the present invention a new and improved method of operating a fossil fuel-fired power generation system in order to thereby by able to attain optimization of the operating efficiency of such a fossil fuel-fired power generation system when such a fossil fuel-fired power generation system is being operated at other than full load. In addition, in accordance with the present invention there has been provided a method of operating a fossil fuel-fired power generation system in order to thereby be able to attain optimization of the operating efficiency of such a fossil fuel-fired power generation system, while yet at the same time ensuring that the range of temperatures required for the operation of the selective catalytic reduction equipment, i.e., the SCR, is still satisfied. Furthermore, there has been provided in accord with the present invention a method of operating a fossil fuel-fired power generation system in order to thereby be able to attain optimization of the operating efficiency of such a fossil fuel-fired power generation system when such a fossil fuel-fired power generation system is being employed in a new application. Penultimately, in accordance with the present invention there has been provided a new and improved method of operating a fossil fuel-fired power generation system in order to thereby be able to attain optimization of the operating efficiency of such a fossil fuel-fired power generation system when such a fossil fuel-fired power generation system is employed in a retrofit application. Finally, there has been provided in accord with the present invention a method of operating a fossil fuel-fired power generation system in order to thereby be able to attain optimization of the operating efficiency of such a fossil fuel-fired power generation system, which is relatively easy to apply and operate, while yet being relatively inexpensive to provide.

While several embodiments of our invention have been shown, it will be appreciated that modifications thereof, some of which have been alluded to hereinabove, may still be readily made thereto by those skilled in the art. We, therefore, intend by the appended claims to cover the modifications alluded to herein as well as all the other modifications which fall within the true spirit and scope of our invention.

What is claimed is:

1. A method of operating a fossil fuel-fired power generation system in order to thereby optimize the operating thermal efficiency thereof comprising the steps of:

a. providing a fossil fuel-fired stem generator having a burner region and a gas pass;

b. effecting the combustion of fossil fuel and air within the burner region of the fossil fuel-fired stem generator such that gases of combustion are produced therefrom and are made thereafter to flow to the gas pass of the fossil fuel-fired steam generator;

c. providing a first heat transfer surface in the gas pass of the fossil fuel-fired steam generator downstream of the burner region of the fossil fuel-fired steam generator and in gas flow relation therewith;

d. providing an air preheater downstream of the first heat transfer surface;

e. providing duct work in the form of a first section, a second section and a third section thereof interconnecting the first heat transfer surface to the air preheater in gas flow relation therewith;

f. providing for the gases of combustion produced within the burner region of the fossil fuel-fired steam generator a first flow path from the burner region of the fossil fuel-fired steam generator to and through the first heat transfer surface located in the gas pass of the fossil fuel-fired steam generator and through the first section, second section and third section of duct work to the air preheater;

g. providing an interconnection upstream of the first heat transfer surface from the gas pass of the fossil fuel-fired steam generator to the second section of duct work;

h. providing for the gases of combustion produced within the burner region of the fossil fuel-fired steam generator a second flow path from the burner region of the fossil fuel-fired steam generator through the interconnection from the gas pass of the fossil fuel-fired steam generator to the second section of duct work and from the second section of duct work through the third section of duct work to the air preheater;

i. sensing the temperature of the gases of combustion exiting front the air preheater; and j. controlling the temperature of the gases of combustion exiting from the air preheater by controlling in response to sensing the temperature of the gases of combustion exiting from the air preheater the extent to which the gases of combustion produced within the burner region of the fossil fuel-fired steam generator flow along the first flow path from the burner region of the fossil fuel-fired steam generator to the air preheater and the extent to which the gases of combustion produced within the burner region of the fossil fuel-fired steam generator flow along the second flow path from the burner region of the fossil fuel-fired steam generator to the air preheater in order to thereby optimize the operating thermal efficiency of the fossil fuel-fired power generation system while at the same time ensuring that the air preheater is protected against corrosion caused by the temperature of the gases of combustion exiting from the air preheater falling below the acid dewpoint temperature.

2. The method of operating a fossil fuel-fired power generation system as set forth in claim 1 wherein the interconnection from the gas pass of the fossil fuel-fired steam generator to the second section of duct work comprises a bypass provided around the first heat transfer surface externally of the fossil fuel-fired steam generator.

3. The method of operating a fossil fuel-fired power generation system as set forth in claim, 2 further comprising the step of providing the bypass with a damper.

4. The method of operating a fossil fuel-fired power generation system as set forth in claim 3 further comprising the step of controlling the positioning of the damper within the bypass in response to the sensings made of the temperature of the gases of combustion exiting from the air preheater such as to thereby control through the positioning of the damper within the bypass the extent to which the gases of combustion produced within the burner region of the fossil fuel-fired steam generator flow along the second flow path from the burner region of the fossil fuel-fired steam generator to the air preheater.

5. The method of operating a fossil fuel-fired power generation system as set forth in claim 4 further comprising the step of providing a damper downstream of the first heat transfer surface.

6. The method of operating a fossil fuel-fired power generation system as set forth in claim 5 further comprising the step of controlling the positioning of the damper provided downstream of the first heat transfer surface in response to the sensings made of the temperature of the gases of combustion exiting from the air preheater such as to thereby control through the positioning of the damper provided downstream of the first heat transfer surface the extent to which the gases of combustion produced within the burner region of the fossil fuel-fired steam generator flow along the first flow path from the burner region of the fossil fuel-fired steam generator to the air preheater.

7. The method of operating a fossil fuel-fired power generation system as set forth in claim 6 further comprising the step of effecting in unison the positioning of the damper provided within the bypass and the positioning of the damper provided downstream of the first heat transfer surface in response to the sensings made of the temperature of the gases of combustion exiting from the air preheater.

8. The method of operating a fossil fuel-fired power generation system as set forth in claim 1 wherein the interconnection from the gas pass of the fossil fuel-fired steam generator to the second section of duct work comprises a bypass provided around the first heat transfer surface internally of the fossil fuel-fired steam generator.

9. The method of operating a fossil fuel-fired power generation system as set forth in claim 8 further comprising the step of providing a damper upstream of the first heat transfer surface.

10. The method of operating a fossil fuel-fired power generation system as set forth in claim 9 further comprising the step of controlling the positioning of the damper provided upstream of the first heat transfer surface in response to the sensings made of the temperature of the gases of combustion exiting from the air preheater such as to thereby control through the positioning of the damper provided upstream of the first heat transfer surface the extent to which the gases of combustion produced within the burner region of the fossil fuel-fired steam generator flow along the second flow path from the burner region of the fossil fuel-fired steam generator to the air preheater.

11. The method of operating a fossil fuel-fired power generation system as set forth in claim 10 further comprising the step of providing a plurality of dampers arranged in gang-like fashion downstream of the first heat transfer surface.

12. The method of operating a fossil fuel-fired power generation system as set forth in claim 11 further comprising the step of controlling the positioning of the plurality of dampers arranged in gang-like fashion provided downstream of the first heat surface in response to the sensings made of the temperature of the gases of combustion exiting from the air preheater such as to thereby control through the plurality of dampers arranged in gang-like fashion provided downstream of the first heat transfer surface the extent to which the gases of combustion produced within the burner region of the fossil fuel-fired steam generator flow along the first flow path from the burner region of the fossil fuel-fired steam generator to the air preheater.

13. The method of operating a fossil fuel-fired power generation system as set forth in claim 12 further comprising the step of effecting in unison the positioning of the damper provided upstream of the first heat transfer surface and the positioning of the plurality of dampers arranged in gang-like fashion provided downstream of the first heat transfer surface in response to the sensings made of the temperature of the gases of combustion exiting from the air preheater.

14. The method of operating a fossil fuel-fired power generation system as set forth in claim 1 further comprising the step of providing in the gas pass of the fossil fuel-fired steam generator a second heat transfer surface upstream of the first heat transfer surface and in gas flow relation therewith.

15. The method of operating a fossil fuel-fired power generation system as set forth in claim 14 further comprising the step of providing selective catalytic reduction equipment downstream of the first heat transfer surface in gas flow relation therewith.

16. The method of operating a fossil fuel-fired power generation system as set forth in claim 15 further comprising the step of providing a third heat transfer surface downstream of the selective catalytic reduction equipment in gas flow relation therewith.

* * * * *